United States Patent

[11] 3,554,296

| [72] | Inventor | Charles L. Lehman |
| | | Rte. 3, Box 53, Corpus Christi, Tex. 77715 |
| [21] | Appl. No. | 703,977 |
| [22] | Filed | Feb. 8, 1968 |
| [45] | Patented | Jan. 12, 1971 |

[54] CHISEL-LISTER ASSEMBLY
11 Claims, 8 Drawing Figs.

[52] U.S. Cl. ........................................................ 172/700, 172/744
[51] Int. Cl. ........................................................ A01b 13/08
[50] Field of Search ........................................... 172/699, 720, 722, 735, 728, 700, 192, 758, 759, 754, 196, 742, 744, 762, 762

[56] References Cited
UNITED STATES PATENTS

| 106,192 | 8/1870 | Murfee | 172/722X |
| 563,752 | 7/1896 | Dean | 172/728 |
| 3,010,744 | 11/1961 | Hollis | 172/763X |

FOREIGN PATENTS

| 1,098,749 | 3/1955 | France | 172/700 |
| 158,559 | 12/1939 | Germany | 172/700 |

*Primary Examiner*—Robert E. Bagwill
*Assistant Examiner*—Stephen C. Pellegrino
*Attorney*—Hyer, Eickenroht and Thompson ABSTRACT: A farm implement having a laterally extending tool bar which is adapted to be moved forwardly over the ground level and a plurality of chisels supported at spaced-apart locations along the tool bar. Each chisel has a point on the front side of its lower end for penetrating the soil to form a trench therein as the tool bar moves forwardly. Each of a plurality of lister assemblies is mounted on a chisel to dispose a cutting edge on its lower edge in position to sever the soil beneath the ground level and above the chisel point and turn it onto beds on opposite sides of the trench.

Charles L. Lehman
INVENTOR.

BY Browning, Hyer, Zickerroht & Thompson
ATTORNEYS

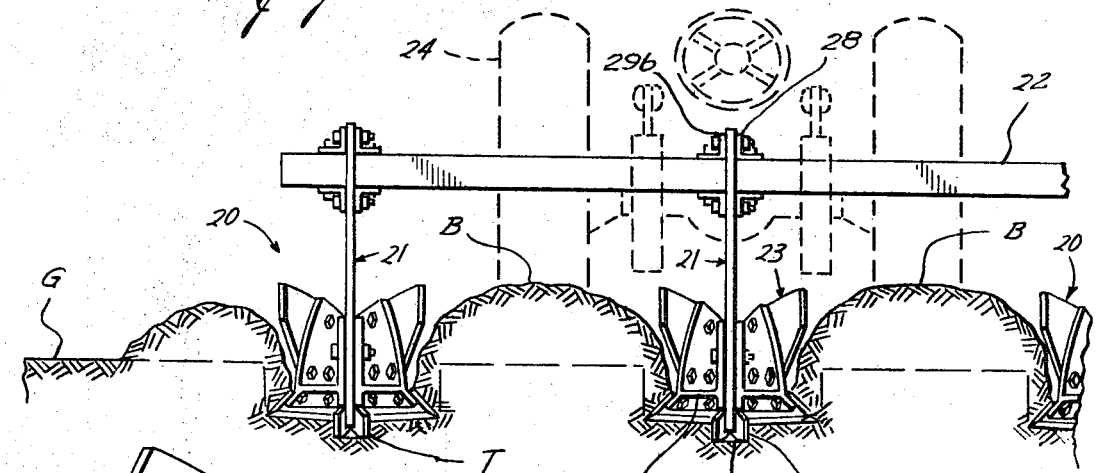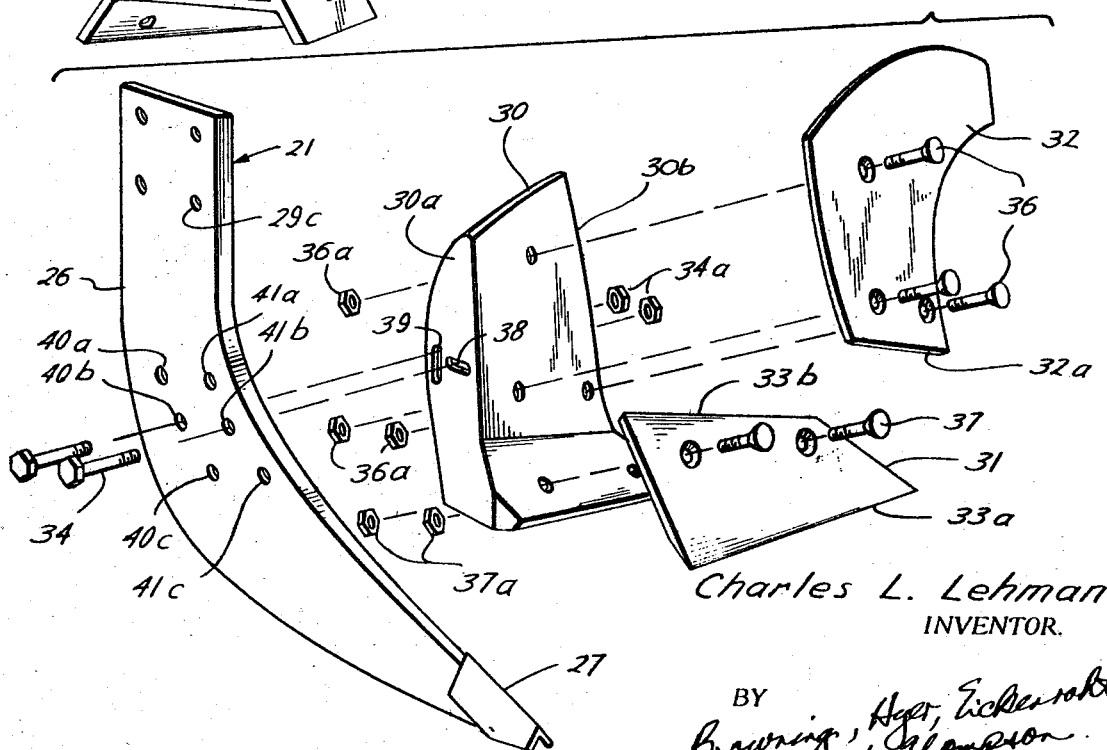

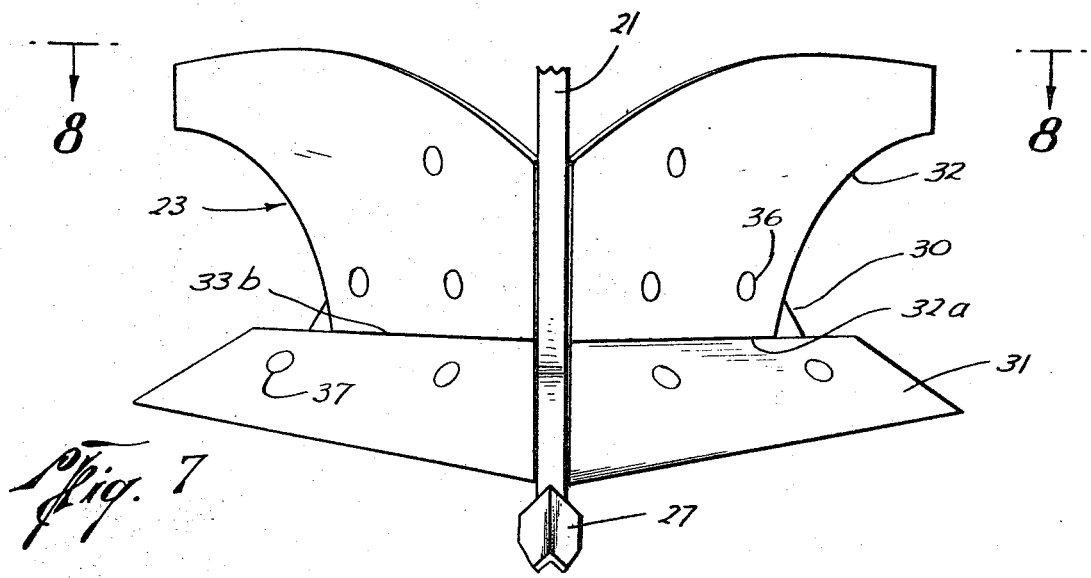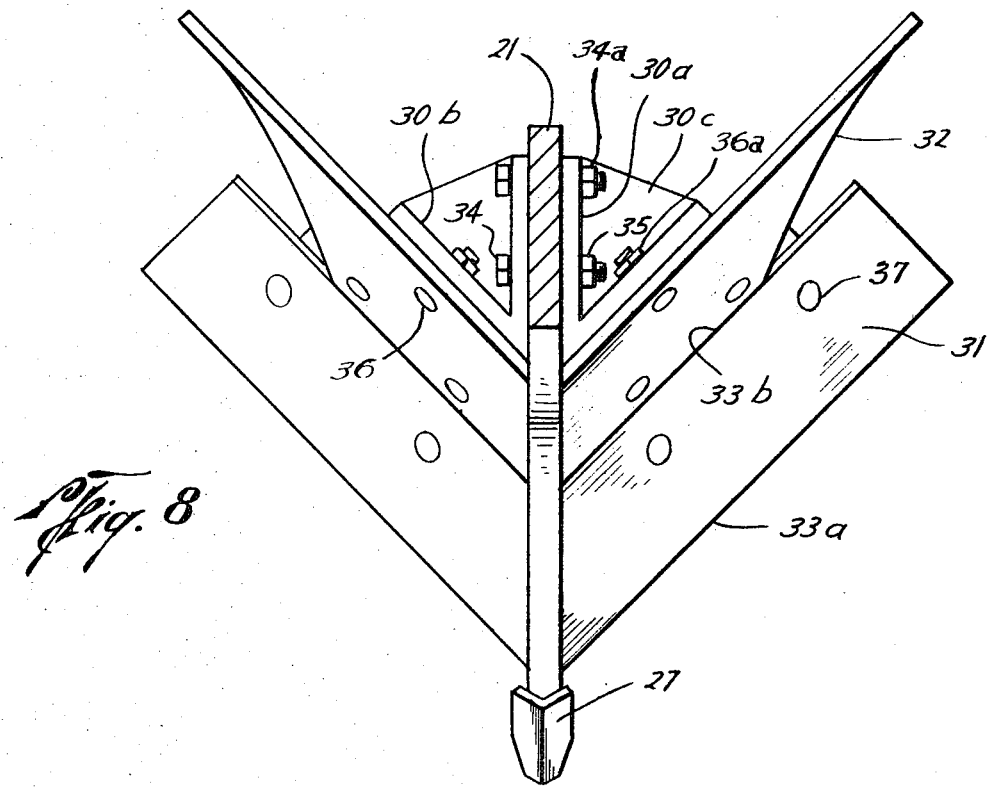

CHISEL-LISTER ASSEMBLY

This invention relates generally to farm implements; and, more particularly, to improvements in farm implements of the type used in cultivating row crops preparatory to planting.

After a crop is harvested, its stalks are cut and its roots removed in order to prepare the soil for planting of the next crop. A farm implement commonly used to remove the roots and prepare new beds, and known as a lister or buster, comprises blades which are arranged as a "V", much like a plow. As the lister is pulled forwardly along the length of a row by means of a tractor, the apex of the "V" penetrates the soil to a relatively shallow depth to permit the cutting edges on the lower edges of the blades to sever the soil beneath the roots, and the blades turn this soil onto the beds on opposite sides of the row. Obviously, several of these listers may be mounted from and pulled by the tractor for working different rows.

The soil beneath the level of normal cultivation is often so compacted that moisture cannot penetrate it. Thus, it may be desirable to cut through this "hard pan" with an implement known as a chisel or subsoiler, and comprising a heavy forging having a shank which is relatively narrow from front to back. The upper end of the shank is mounted on a tool bar or the like adapted to be towed by a tractor, and there is a "point" on the lower end of the front of the shank. Due to the weight and shape of the chisel, this point will penetrate deeper into the soil than a lister or the like, and thereby form a relatively deep trench which penetrates the hard pan. Similar to the listers, several of these chisels may be mounted in spaced-apart relation across the tool bar so as to simultaneously form trenches along several rows.

Since they must follow the same paths, it has heretofore been the practice to use the listers and chisels in separate traverses or runs of the rows. This is not only time consuming, but also requires two separate implements. Also, and depending on the horsepower available, it is often necessary to run the listers over the rows several times in order to loosen the soil to the desired depth. Furthermore, due to their narrow configurations, chisels are susceptible to considerable side draft.

An object of this invention is to provide a farm implement which will perform the function of both a lister and chisel in a single traverse or run.

Another object is to provide such a farm implement in which the lister is able to penetrate the soil to deeper depths with relatively less horsepower.

A further object is to provide such a farm implement in which the usual side draft of the chisel is lessened to a great extent.

Still another object is to provide such a farm implement which facilitates penetration of the lister to different depths.

A still further object is to provide a farm implement of the character described in any one of the foregoing objects which has little or no tendency to clog up with soil, which is relatively simple and inexpensive to construct, and which permits its more expandible parts to be replaced or repaired with ease and speed.

These and other objects are accomplished, in accordance with the illustrated embodiment of this invention, by a farm implement comprising a tool bar, a plurality of chisels adapted to be supported along the length of the tool bar, and a plurality of lister assemblies each adapted to be mounted on a chisel with their cutting edges above the point on the chisel. This combination not only permits simultaneous bedding and trenching operations, but also provides improvements in each in that the chisel point permits greater and more selective penetration of the lister assembly, where desired, and the lister assembly stabilizes and thereby reduces the usual side draft on the chisel.

More particularly, and in accordance with the preferred embodiment of the invention, each lister assembly is so mounted on the chisel that its elevation may be adjusted to dispose its cutting edges at selected levels above such point. Thus, this in turn permits the soil to be severed at different depths beneath the ground level, regardless of the horsepower available for causing the chisel to penetrate the soil. It is further preferred that each lister assembly comprise a pair of lister halves and that each such half be attachable to a side of the chisel so that there is little or no chance for soil to become wedged between the lister assembly and the chisel.

It is still further preferred that the shear plate of each lister half, which is more susceptible to wear than the mold board, be separately mountable on the chisel so that it may be replaced or repaired without removal of the mold board. Along this same line, each lister half includes a "V" shaped bracket having an outer wing for mounting each of the shear plate and mold board to the side of the chisel. The elevation of the cutting edge at the lower edge of the shear plate is adjusted by attachment of the inner wing of the bracket to suitable means at different vertical levels along the length of the chisel. This latter adjustment preferably includes means for tilting the bracket, and thus the shear plate and mold board, about a horizontal axis. In this manner, the front end of the cutting edge can be maintained at a level somewhat lower than the rear end thereof, regardless of the depth of penetration of the chisel.

In the drawings, wherein like reference characters are used throughout to designate like parts:

FIG. 4 is a rear view of the implement, which illustrates the manner in which the chisel and lister assemblies may be duplicated across the length of the tool bar;

FIG. 5 is an exploded view, in perspective, of the chisel and one of the lister halves attachable to a side of the chisel;

FIG. 6 is a perspective view of the bracket of the lister assembly, as seen from the backside thereof;

FIG. 7 is an enlarged front elevational view of the implement; and

FIG. 8 is a top plan view of such implement, as seen along broken lines 8—8 of FIG. 7.

Figure 1:
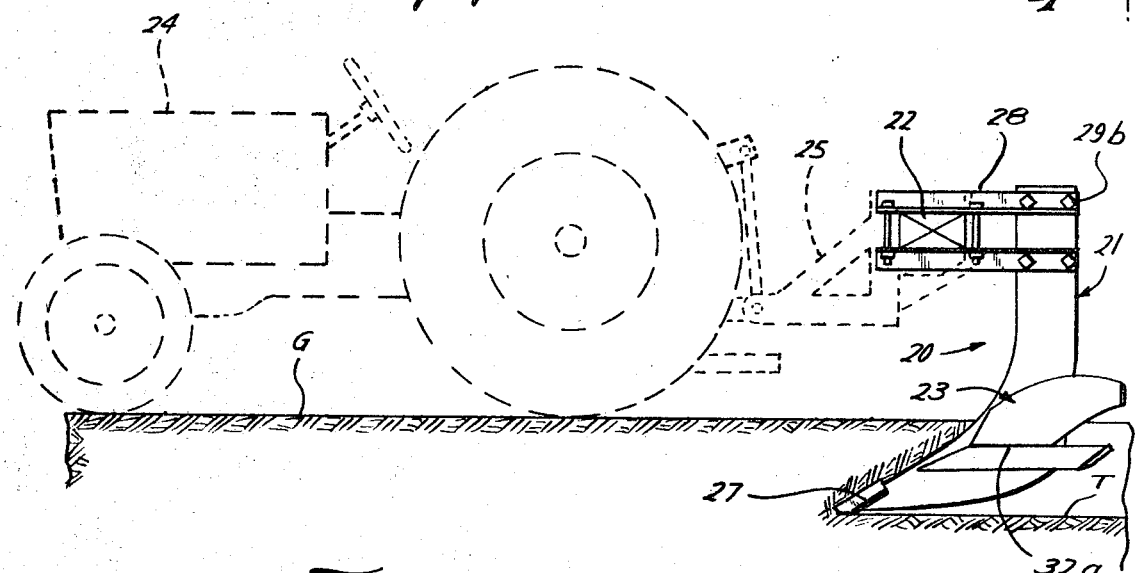
FIG. 1 is a side view of a farm implement constructed in accordance with the present invention and mounted upon a tool bar adapted to be towed by a tractor, which is shown in broken lines.
Figure 2:
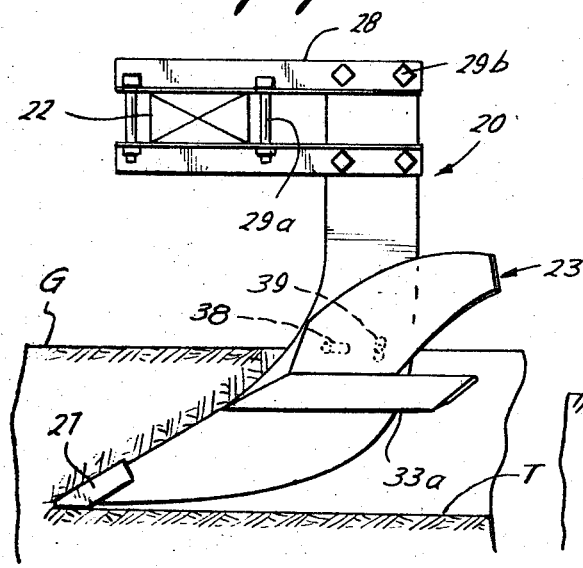
FIG. 2 is a side view of the implement, similar to FIG. 1, but with the lister assembly in a position relative to the vertical length of the chisel which is above its position shown in FIG. 1.
Figure 3:
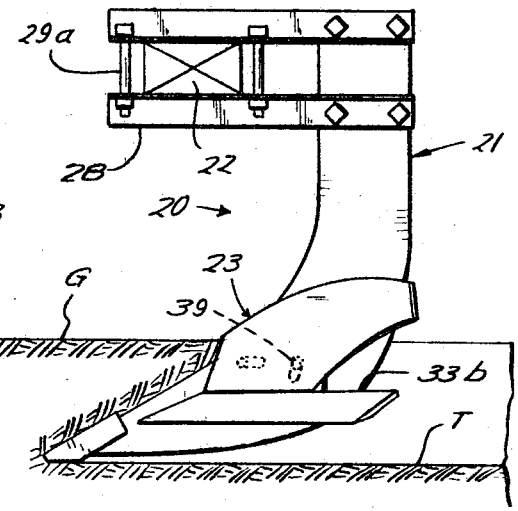
FIG. 3 is another side view of the implement, similar to FIG. 2, but with the lister assembly moved to a position relative to the vertical length of the chisel which is below that shown in FIG. 1.

With reference now to the details of the above-described drawings, the overall farm implement which is shown in each of FIGS. 1—4, and designated in its entirety by reference character 20, comprises one or more chisels 21 supported from a tool bar 22 in position to penetrate the soil and form a trench T beneath the ground level G as the tool bar is towed forwardly (from right to left as seen in FIGS. 1—3) by means of a tractor 24. A lister assembly 23 is mounted on each chisel above the lower end of the chisel so as to sever the soil above the lower end of the trench and turn it onto beds B (see FIG. 4) on opposite sides of each furrow through which the chisel is drawn.

As well-known in the art, the tractor may have a three-point hitch 25 or similar means for raising and lowering the tool bar 22, and thus the implement 20 supported therefrom. As can be seen from FIGS. 1—4, the tool bar extends laterally of the direction of movement of the tractor and, as illustrated in FIG. 4, is of such length that the chisels and lister assemblies may be spaced along it for working several rows.

As previously mentioned, and as best illustrated in FIG. 5, the chisel 21 is of more or less conventional construction in that it comprises a shank 26, which is narrow from front to back, and a point 27 at the front of its lower end. In the particular embodiment of the chisel shown in these drawings, the shank is curved on a large radius to provide a relatively large forwardly extending portion leading to the point 27. However, in other forms of chisels, the shank may be predominantly vertically extending, with only a short horizontal portion for mounting the point 27. In any case, the shank comprises a heavy forged bar adapted to withstand extremely high loads as its point penetrates a relatively deep portion of the soil and is moved forwardly therethrough, as illustrated in each of FIGS. 1—3.

The point 27 is also of cone conventional construction in that it comprises a separate member of highly wear-resistant material adapted to be removably secured to the front of the lower end of the shank, as illustrated. In this way, the point leads the remainder of the shank and bears the brunt of the wear on the chisel.

The upper end of the shank is supported from the tool bar 22 in any suitable manner for disposing it in a substantially upright position. For this purpose, and as illustrated in FIGS. 1—4, angles 28 extend along opposite sides of the chisel shank and above and below the tool bar 22, with the upper angles being connected to the lower angles by bolts 29a extending vertically by opposite ends of the tool bar, and with the upper and the lower angles being connected to one another by bolts 29b extending horizontally through holes 29c (see FIG. 5) in the chisel shank.

As previously described, and as shown in the drawings, each lister assembly 23 preferably comprises a pair of lister halves each of which is adapted to be attached to an opposite side of the chisel 21. In any event, the lower cutting edges 33a of the lister assembly, and thus the cutting edge of each lister half, are above the point 27 in each of the three illustrated positions of the assembly on the chisel. More particularly, and as illustrated by a comparison of FIGS. 1, 2 and 3, each lister assembly is adjustable along the vertical length of the chisel to permit the cutting edges to be disposed at a selected level above the point, which in turn determines the depth to which the cutting edges of the lister assembly sever the soil beneath the ground level G.

For example, with the lister assembly in its uppermost position, as shown in FIG. 2, there is relatively shallow penetration of the lister assembly, even though there is maximum penetration of the chisel. Conversely, with the lister assembly 23 moved to its lower-most position with respect to the point 27 of the chisel 21, there is maximum penetration of the lister assembly, even though there is minimum penetration of the chisel. In the intermediate position of the lister assembly relative to the vertical length of the chisel, the lister assembly assumes median penetrating position.

As best shown in FIG. 4, each lister half comprises a bracket 30 adapted to be attached to a side of the chisel 21, and a shear plate 31 and a mold board 32 adapted to be attached to the bracket 30 for mounting on the one side of the chisel. As is best shown in FIG. 5, the shear plate 31 comprises a relatively thin sheet having an upper edge 33b which is parallel to the lower cutting edge 33, and a forward end which tapers downwardly from its upper to its lower edge to a point along the cutting edge. Since, as previously mentioned, the cutting edge 33a is susceptible of the most wear in the use of the lister assembly 23, the shear plate 31 is formed of a specially hardened steel, and may be replaced or repaired from time to time separately of the mold board 32, which is susceptible of less wear and thus need not be of a specially hardened steel.

The mold board 32 also comprises a relatively thin metal sheet which has a lower edge 32a abutting with the upper edge 33b of the shear plate 31. More particularly, and as can be seen from the drawings, these edges are vertically aligned with one another so that the outer face of the mold board forms an upwardly and forwardly extending continuation of the outer face of the shear plate 31. Similarly, the forward end of the mold board 32 lies substantially flush with the forward end of shear plate 31, when the two are attached to the bracket 30, and both ends are chamfered for disposal flat against the side of the chisel 21, as shown in FIG. 8. The rear end of the mold board extends upwardly from its lower edge 32a and then flares upwardly and outwardly to form an overhang above the outer end of the upper edge 33b of the shear plate. The purpose and function of the gap or recess so formed between the mold board and shear plate in the use of this implement, will be described in some detail to follow.

The bracket 30 for mounting the shear plate and mold board on each side of the chisel 21 is made up of inner and outer wings 30a and 30b, respectively, which diverge from their intersection at the front ends to form a "V". These wings are reinforced by means of a brace 30c extending laterally between their inner sides.

The inner wing 30a of each bracket 30 is attached to a side of the chisel 21 by bolts 34 secured by means of nuts 34a. With the inner wing 30a so attached, its outer face lies flat against the adjacent side of the chisel 21 and the outer wing extends rearwardly therefrom at an acute angle.

As best shown in FIG. 5, the outer faces of the bracket wing 30b are formed to dispose the mold board and shear plate at the proper angle relative to one another. Thus, the wing 30b has a substantially vertically disposed upper face and a lower face which projects downwardly and outwardly therefrom. The upper face and the mold board have aligned holes therethrough to receive bolts 36 adapted to be secured by nuts 36a; and the lower face and the shear plate 31 have openings to receive bolts 37 adapted to be secured by nuts 37a. As shown in FIG. 5, the bolt holes in the mold board and shear plate are countersunk so that the heads of bolts 36 and 37 are flush with the faces of these parts.

The means for attaching the bracket 30 to a side of the chisel 21 includes holes 38 and 39 in the inner wing 30a of the bracket 30 aligned with a selected set of holes in the chisel 21. As can be seen from FIG. 5, there are three vertically spaced apart sets of such holes 40a-41a 40b-41b, and 40c-41c in the chisel shank. In the uppermost position of the lister half relative to the chisel, holes 38 and 39 are aligned with holes 40a and 41a, respectively, so as to receive the bolts 34 there through. In order to adjust the lister half to its lowermost position relative to the chisel, the bracket wing 30a is moved down to align its holes 38 and 39 with the holes 40c and 41c, respectively, whereupon the bolts 34 are extended therethrough. In the intermediate position of the lister half, on the other hand, the holes 38 and 39 are aligned with the holes 40b and 41b, respectively.

As shown in the drawings, the hole 39 comprises a substantial vertically extending slot, which enables the nut securing the bolt 34 extending through the hole 39 to be loosened, and the bracket 30 to be swung about the horizontal axis defined by the other bolt 34 extending through hole 38. This swinging of the bracket 30 will, of course, affect the angular inclination of the cutting edge 33a of the shear plate 31, which may be necessary in maintaining the forward end of the cutting edge 33a of the shear plate 31 at an elevation lower than the rearward edge thereof, whereby the shear plate will dig into the soil in the desired manner. Thus, it will be understood that as the elevation of the tool bar 22 changes so as to raise or lower the point 27 of the chisel relative to the ground level G, the angular position of the cutting edge 33a also changes.

The other hole 38 in the wing 30a of the bracket 30 is also elongated to form a slot extending in a generally horizontal position. This may be found necessary in order to move the bolt 34 adapted to extend through the hole 38 out of the way of the nut 36a for attaching the bolt 36 extending through the hole in the lower forward corner of the upward face of wing 30b of the bracket 30. When the nut is then attached to this bolt 36, the bolt 34 can be swung to the desired position in the elongated slot 38 and the nut 34a tightened thereon.

In the operation of this farm implement, and as the tractor 24 moves forwardly (from left to right in FIG. 1); the hitch 25 lowers the point 27 on the chisel 21 to permit it to penetrate the soil, and thereby form a trench T through the middle of each furrow. At the same time, the cutting edges 33a of each of the shear plates 31 follow the penetration of the point 27 so as to slice the soil on each side of the trench and at a selected level above the point 27. The layer of soil which is severed by the shear plates moves upwardly over the face of the shear plate and onto the face of the mold board 32. The upwardly and outwardly curving upper end of the mold board 32 turns the severed soil outwardly onto beds B on opposite sides of the furrow and laterally outwardly from the trench T. As will be apparent from FIG. 4, soil which passes over the outer portion of shear plate 32 as well as some of the soil delivered to the mold board 32 from the shear plate 31 will pass through the gap or recess between the overhang of the mold board and the outer end of the shear plate, so that the beds B will be built up inwardly of the outer ends of the shear plates 31.

As previously described, and as will be obvious from the foregoing, the normal use of this implement will permit the simultaneous chiseling or subsoiling and bedding of one or more row crops. It will also be understood from the foregoing that the extent of the penetration of the cutting edge 33a of the shear plate 31, and thus the depth of cut, may be controlled by adjustment of the location of the lister halves along the vertical length of the chisel. Thus, in the use of this implement, the soil may be loosened to the desired depth during a single run, or to successively lower depths during successive runs.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A farm implement, comprising a laterally extending tool bar adapted to be moved forwardly over the ground level, a plurality of chisels each having a narrow shank and a point on the front side of the lower a end of said shank, means for supporting the chisels at spaced-apart locations along the tool bar and with the points thereof facing in a forward direction in order to penetrate the soil and form a trench therein as the tool bar is moved forwardly, a plurality of lister assemblies, each lister assembly including a pair of lister halves each having a shear plate with a cutting edge at its lower end and a mold board above it, and means for mounting each lister assembly on the shank of said chisel to dispose said lister halves on opposite sides of the shank and above the lower end of the point so as to sever the soil beneath the ground level and the bottom of the trench and turn it onto beds on opposite sides of the trench during forward movement of the tool bar, and said mounting means including means for adjusting the elevation of each lister half on the shank so as to dispose the cutting edge thereon at selected levels above the chisel point, the forward end of each shear plate being rearwardly of the forward edge of the shank and lying against the side of the shank in each of its selected levels of adjustment.

2. A farm implement, comprising a chisel having a narrow shank and a point on the front side of the lower end of said shank, means for supporting the chisel on a vehicle with said point in position to penetrate the soil and form a trench therein as the chisel is moved in a forward direction through the soil, a pair of lister halves a each having a shear plate with a cutting edge at its lower edge and a mold board above it, and means for attaching the lister halves to opposite sides of the shank and with the cutting edges of the shear plate in position to sever the soil above the lower end of the chisel point and turn it onto beds on opposite sides of the trench during forward movement of said chisel, said attaching means including means for adjusting the elevation of each lister half on the shank so as to dispose the cutting edge thereon at selected levels above the chisel point, the forward end of each shear plate being rearwardly of the forward edge of the shank and lying against the side of the shank in each of its selected levels of adjustment.

3. A farm implement, comprising a chisel having a narrow shank adapted to be supported on a vehicle and a forwardly extending point at the lower end of the shank for penetrating and forming a trench in the soil as the chisel is moved forwardly therethrough, a pair of lister halves each including a shear plate having a lower cutting edge and a mold board above the shear plate, and means for attaching each lister half to a side of the shank to dispose the cutting edge above the lower end of the point for severing the soil above the bottom of the trench and turning it onto beds on opposite sides of the trench, said mounting means including means for adjusting the elevation of the lister halves along the vertical length of the shank so as to dispose the cutting edges at selected levels above the lower end of the point, the forward end of each shear plate being rearwardly of the forward edge of the shank and lying against the side of the shank in each of its selected levels of adjustment.

4. A farm implement of the character defined in claim 3, wherein the adjusting means for said bracket attaching means includes means for swinging each bracket about a horizontal axis disposed rearwardly of the front end of the cutting edge of the shear plate.

5. A farm implement of the character defined in claim 3, wherein each of the shear plate and mold board of each lister half is separately supported by said bracket to permit its replacement separately of the other.

6. A farm implement of the character defined in claim 3, wherein the front ends of the shear plate and mold board of both lister halves are tapered for disposal adjacent the sides of the chisel.

7. A farm implement of the character defined in claim 3, wherein the attaching means comprises sets of holes spaced along the vertical length of the chisel shank, a set of holes in each bracket for alignment with selected set of holes in the chisel shank, and bolts extendable through the aligned sets of holes.

8. A farm implement of the character defined in claim 7, wherein one of the holes in each bracket comprises a slot to permit the bracket to swing about a horizontal axis.

9. A lister half to be mounted on a chisel shank, comprising a bracket having inner and outer wings diverging rearwardly from their intersection to form a V, means on the inner wing of the bracket for attaching the outer side of the inner wing to one side of a chisel shank, a shear plate having a lower cutting edge and a downwardly and forwardly tapered front end, a mold board, and means for independently removably attaching each of the shear plate and the mold board to the outer side of the outer wing of the bracket with the lower cutting edge of the shear plate below the lower edge of said outer wing and the lower edge of the mold board above and substantially adjacent the upper edge of the shear plate, whereby the fact of the mold board forms a substantial continuation of the face of the shear plate, the front ends of the shear plate and mold board, when so attached, lying in the same plane with one another and the outer side of the inner wing and extending forwardly of the intersection of the wings of the V, to lie substantially adjacent the side of the chisel shank to which the bracket is attached.

10. A farm implement of the character defined in claim 9, wherein said other wing of the bracket has a first portion against which the shear plate is disposed and second portion extending upwardly and outwardly from the first portion against which the mold board is disposed.

11. A farm implement of the character defined in claim 9, wherein the means for attaching the bracket to the chisel shank includes a pair of holes in said one wing for receiving bolts, and one of said holes is a substantially vertically extending slot and the other of said holes is a substantially horizontally extending slot horizontally opposite the one slot.

UNITED STATES PATENT AND TRADEMARK OFFICE
CERTIFICATE OF CORRECTION

PATENT NO. : 3,554,296
DATED : January 12, 1971
INVENTOR(S) : Charles L. Lehman

It is certified that error appears in the above-identified patent and that said Letters Patent are hereby corrected as shown below:

Column 1, line 57, change "expandible" to --expendible--.

Column 3, line 6, cancel "cone".

Column 4, line 67, change the semi-colon to a comma.

UNITED STATES PATENT AND TRADEMARK OFFICE
CERTIFICATE OF CORRECTION

PATENT NO. : 3,554,296

DATED : January 12, 1971

INVENTOR(S) : Charles L. Lehman

It is certified that error appears in the above-identified patent and that said Letters Patent are hereby corrected as shown below:

Claim 1, line 4, cancel "a"
line 14, after "and" and before "the" insert --above--.

Claim 2, line 6, cancel "a".

Claim 3, line 11, change "mounting" to --attaching--.

Claim 4, line 2, after "wherein" and before "the" insert --each lister half includes a bracket for supporting the mold board above the shear plate, the attaching means includes means for attaching each bracket to a side of the shank and means for adjusting the attached position thereof along the vertical length of the shaft,--.

Claim 5, line 2, after "wherein" and before "each" insert --each lister half includes a bracket, and Claim 7, line 2, after "wherein" and before "the" insert --each lister half includes a bracket for supporting the mold board above the shear plate, and--.

Claim 9, line 13, change "fact" to --face--.

Signed and Sealed this

Twenty-sixth Day of January

[SEAL]

Attest:

Attesting Officer

GERALD J. MOSSINGHOFF

Commissioner of Patents and Trademarks